Patented Apr. 21, 1942

2,280,207

UNITED STATES PATENT OFFICE 2,280,207

HYDROHALOGENATION OF OLEFINS

Hein Israel Waterman, Delft, and Jacob Jan Leendertse, Overveen, Netherlands, assignors to Shell Development Company, San Francisco, Calif., a corporation of Delaware No Drawing. Application January 15, 1940, Serial No. 313,928. In the Netherlands February 1, 1939

8 Claims. (Cl. 260—663)

The invention relates to a process of producing alkyl halides and more particularly pertains to the addition of hydrogen halides to alkylenes and partially halogenated alkylenes.

In a more specific aspect the invention is concerned with a process for the manufacture of alkyl halides by reacting olefins or halogenated olefins with hydrogen halides while under the specific and selective influences of certain catalysts the use of which comprises one of the phases of the present invention.

Unsaturated straight chain hydrocarbons including mono-, di- and tri-olefins as well as their halo-substituted analogues are commonly employed as starting materials for the ultimate production of a large number of organic derivatives. This is due to the relatively high degree of activity of these olefins with various treating reagents. This ready reactivity of olefins contrasts them strongly with the behavior of their saturated counterparts, namely, the paraffins, which have substantially no reactivity with ordinary reagents at moderate temperatures.

One of the main characteristics of alkylenes, and particularly of the mono-olefins resides in the capability of these hydrocarbons to react directly and additively with mineral acids, hydrogen halides, the halogens, oxygen, oxidizing compounds and hydrogen. This is particularly true when the reaction is effected under suitable catalytic influences. Mono-olefins and their halo-substituted analogues, with which the present invention is principally concerned, may be converted into the corresponding saturated alkyl halides by the addition thereto of a hydrogen halide under the influence of catalysts of the type of aluminum chloride. However, owing to the general reactivity which involves also their tendency to polymerize under catalytic or chemical influences, it is ordinarily difficult to confine the reaction between a given olefin and a reagent of the type of hydrogen halide in one precise direction so as to obtain high yields of a desired compound with a minimum formation of undesirable by-products. For example, the interaction between alkylenes such as mono-olefins and hydrogen halides in the presence of the usual metallic halide catalysts, although effecting the formation of the corresponding alkyl halides, also produces a considerable polymerization of the olefins. It is true that the yield of the desirable alkyl halides may be considerably improved by effecting the reaction in a liquid phase and at very low temperature, for example, in the order of —80° C., or even lower. However, the necessity of maintaining such excessively low temperatures increases considerably the operating costs. Also, in view of the highly exothermic nature of the reactions, it is difficult to maintain these very low temperatures. Furthermore, the reaction rate at these low temperatures is decreased to such an extent that operations are frequently uneconomical.

The reactions involving the addition of hydrogen halides to alkylenes or halogenated alkylenes, and particularly to the mono-olefins and their halo-substituted analogues, have been previously effected in the presence of metallic halides such as aluminum chloride, iron chloride, zinc chloride or the like. Usually these catalysts have been employed in a solid state. In some instances these solid catalysts were deposited on various types of carriers. Such operations have been found to be quite unsatisfactory since the activity of the catalyst decreased rapidly, primarily due to the deposition thereon of high boiling products of polymerization formed as a by-product during the hydro-halogenation reaction. In order to avoid this relatively rapid deterioration or deactivation of the catalysts, it has been previously proposed to employ the catalysts in a liquid state. For this purpose the catalyst was either brought to its melting point and employed at such temperature, or it was dissolved in solvents such as aliphatic or aromatic hydrocarbons or their halogenated derivatives. For example, the alkyl halides obtained as the reaction products have been themselves employed as solvents. The main objection to the use of such catalysts resides in the relatively high temperature necessary for the maintenance of the metallic halides in a liquid state or in solution in the various solvents. For instance, when an anhydrous metal halide such as aluminum chloride or iron chloride is employed in a liquid state the hydro-halogenation reaction had to be effected at temperatures of about 100° C. or above. Even when the metallic halide catalysts are employed in solution in the heretofore known solvents the hydrohalogenation reactions required temperatures of above 100° C., as this is described in French Patent No. 780,057. When operating under superatmospheric pressures according to the known processes, the hydrohalogenation reaction could be realized at slightly lower temperatures. Nevertheless, even these temperatures caused excessive side reactions such as polymerization of the alkylenes with the concurrent lowering of the yields of the desired alkyl halides.

It is therefore the main object of the present invention to provide a process which avoids the above and other defects. Another object is to provide a process for the economic and efficient hydrohalogenation of alkylenes, their halo-substituted analogues, and particularly of monoolefins. A still further object of the invention is to provide a process whereby hydrogen halides may be effectively and economically reacted with alkylenes to produce relatively high yields of the corresponding alkyl halides. Another object is to provide a process whereby high yields of alkyl halides may be obtained by the catalytic interaction of alkylenes and hydrogen halides without the necessity of employing excessively low temperatures.

It has now been discovered the above and other objects may be obtained by effecting the reaction between alkylenes or their halo-substituted analogues and the hydrogen halide in the presence of solid or liquid complex compounds formed by the interaction of metallic halides with ethers or halogenated ethers. Broadly stated these complex compounds are obtained by the simple addition of the metallic halide to an anhydrous ether or a halogenated ether of the class described more fully hereinbelow. The exact composition of these complex compounds is not definitely known at the present time. These complex or addition compounds may be of the oxonium salt type or may be formed by the addition of the metallic halide to the ether or the halogenated ether through the unsatisfied electrons thereon. Irrespective of the chemical structure of the complex compounds thus obtained by the interaction of metallic halides with the ethers, the use of these compounds as a catalyst for the addition of the hydrogen halides to alkylenes and/or halogenated alkylenes results in the obtainment of markedly high yields of alkyl halides without the necessity of employing excessively low temperatures heretofore necessary to avoid the excessive formation of high boiling products of polymerization.

The term "ether," as employed herein, comprises the saturated or unsaturated, alicyclic, cyclic and/or heterocyclic compounds, of symmetrical or unsymmetrical character, containing one or more oxygen atoms per molecule, each of these oxygen atoms being directly attached to two vicinal or nonvicinal carbon atoms. Without any intention of being limited, representative examples of ethers falling within the above defined class and which may be employed for the formation of the complex compounds described herein, include: Symmetrical and asymmetrical aliphatic ethers, such as diethyl ether, the dipropyl ethers, the dibutyl ethers, the diamyl ethers, ethyl-propyl ether, methyl-butyl ether, propyl-butyl ether, diethyl ether of ethylene glycol, and the like, and their homologues and analogues; alkylene oxides wherein the oxygen atom is directly attached to two vicinal or nonvicinal carbon atoms, such as ethylene oxide, propylene oxide, trimethylene oxide, tetramethylene oxide, pentamethylene oxide, and their homologues and analogues; aryl and aralkyl ethers such as anisol, phenetol, diphenyl ether, and the like; heterocyclic ethers, such as furane, coumarone, pyrans, tetrahydropyran, and the like; and cyclic compounds containing more than one oxygen atom each of which is attached to two carbon atoms, such as dioxanes. The aliphatic radicals of the above ethers may be of primary, secondary or tertiary character, and may contain aromatic and/or alicyclic radicals attached thereto. As noted these ethers may also be used in the form of their halogenated derivatives. The following are representative examples of compounds of this class: monochlor-methyl ether, dichlormethyl ether, dichlorethyl ether, butyl chloromethyl ether, p-chloroethyl-p-chloroisopropyl ether, and the like, and their homologues and analogues, as well as the corresponding compounds containing bromine, iodine and/or fluorine. Therefore, the term "ether," as employed herein, also includes the halogenated ethers of the class described.

The metallic halides suitable for use in the preparation of the complex compounds employed as the catalyst for the hydrohalogenation according to the present process include the halides of mono-, di-, tri-, tetra- and even pentavalent metals, as well as mixtures thereof. Representative metallic halides include aluminum chloride, iron chloride, bismuth chloride, antimony chloride, tin chloride, vanadium chloride, zinc chloride, cadmium chloride, molybdenum chloride, titanium chloride, cuprous chloride, cupric chloride, stannous chloride, lithium chloride, calcium chloride, magnesium chloride, boron trifluoride, and the like, and their corresponding bromides and fluorides. In some cases, in order to increase or decrease the activity of a given complex catalyst compound, it is possible to employ mixtures of two or more of the halides which are then reacted with the ether. Thus, the catalytic effect may be greatly increased by employing complex addition compounds in which the ether was reacted with a zinc halide to which a halide of a monovalent or divalent metal other than zinc, e. g. lithium chloride, magnesium, chloride, etc., has been added.

The complex addition compound formed may be either in a liquid or solid form. For example, equimolecular proportions of methyl ether and anhydrous aluminum chloride will combine to form a mobile liquid which can be heated to about 150° C. without any apparent change but which will decompose above this temperature. The addition of further quantities of dimethyl ether forms a relatively stable solid aluminum chloride-methyl ether complex. All metals will not apparently give stable forms of both the liquid and solid complex. For example, calcium chloride, titanium chloride and bismuth chloride form solid complexes with equimolecular proportions of dimethyl ether, whereas antimony chloride and ferric chloride, when reacted in equal molecular proportions with dimethyl ether yield a liquid complex. Similarly, other ethers when commingled with the metal halides may yield a solid and/or a liquid complex.

As indicated, a large number of metal halides are capable of forming a complex addition compound with the ethers. However, it is preferable to employ metal halides of metals having an atomic weight of above about 27, such as aluminum, titanium, tin, antimony, bismuth, iron, etc.

As noted the complex or addition compounds, employed as the hydrohalogenating catalyst in the process of the present invention, are prepared by intimately commingling one or more of the above ethers with one or more metallic halides. In view of the highly exothermic nature of this reaction, it is preferred to employ intensive cooling to remove the heat of reaction. Although the complex compounds formed by the interaction of the ethers or halogenated ethers with the metallic halides usually require equimolecular amounts of the reactants, it is sometimes preferable to use the ether in excess so as to maintain the complex compounds in solution in the excess or unutilized portion of such ether.

The complex metal halide-ether compounds can be prepared at any temperature which is, however, below that at which the complex compound is decomposed. Such upper limit of the temperature at which the formation of the complex may be realized will obviously vary with the specific metal halide and ether employed. Preferably, such reaction should be realized in the liquid phase, i. e., by operating at sufficiently low temperatures or a sufficiently high pressure so that the ether or halogenated ether is in a liquid state. Also, both the metal halide and the ether should be preferably anhydrous. This is particularly true when the metal halide employed is easily ionized in water, since the presence of even relatively small percentages of water would prevent or at least inhibit the formation of the desired complex addition compound.

The quantity of the catalyst to be employed for the efficient hydrohalogenation of alkylenes or of halogenated alkylenes may vary within relatively wide limits. Excellent yields of alkyl halides have been obtained by the use of metal halide-ether complex catalyst in quantities of between about 4% to 10% by weight as calculated on the quantity of the alkylene subjected to the hydrohalogenation in accordance with the process of the present invention. However, higher or lower percentages of the catalyst may be employed. Furthermore, the optimum quantity of catalyst to be used will vary to a certain degree with the particular catalyst employed and on the specific alkylene and hydrogen halide employed as the reactants. For example, it is known that, of the hydrogen halides, hydrogen iodide may be most readily added to alkylenes. The addition of hydrogen bromide takes place less readily, but more easily than the addition of hydrogen chloride which can only be added with considerable difficulty. Also, the reaction between a given hydrogen halide and an olefin requires a stronger catalyst and more rigorous conditions as the number of carbon atoms in the olefin molecule decreases. Furthermore, not all of the metallic halides, and therefore not all of the complex compounds formed by their interaction with ethers or halogenated ethers, have the same catalyzing activity, so that greater or lesser quantities of such catalyst will be required to obtain and maintain the desired rates of addition of a given hydrogen halide to the olefin or halogenated olefin subjected to the hydrohalogenation reaction according to the present invention. Therefore, it may be stated that these catalysts, although they may be considered as equivalents in kind, are not equivalents in degree.

The hydrohalogenation according to the present process may be effected either in the liquid or gas phases, or in a mixed phase wherein the alkylene may be in a liquid state and commingled with the liquid catalyst, the hydrogen halide being conveyed in a gaseous state through the liquid alkylene-catalyst mixture. This last method of operation is particularly suitable for the hydrohalogenation of the normally liquid olefins, such as the secondary olefins having five or more carbon atoms per molecule, as well as of the normally liquid halogenated olefins. When the halogen halide gas is conveyed through a liquid alkylene-catalyst mixture, it is advantageous to agitate the mixture to effect as complete a contact between the reactants as possible. The rate of hydrogen halide throughout may naturally vary within very wide limits. However, if it is desired to avoid excessive recycling or waste, this rate should be controlled so as to obtain the maximum absorption or reaction of the hydrogen halide with the alkylene treated. Obviously, other methods of bringing the reactants in contact with the catalyst may be employed. Thus, it is possible to commingle the alkylene with the catalyst and to convey this mixture countercurrently to a stream of the halogen halide. Also, when the reaction is to be effected in a gaseous state, the alkylenes, or mixtures containing them, may be commingled with the hydrogen halide and then conveyed through a reaction vessel containing complex catalyst in a liquid or solid state. Still other methods of operation will be obvious to those skilled in the art.

In operation, the reaction mixture after removal thereof from the reaction zone, is subjected to further treatment to separate the alkyl halides produced. If the reaction is effected in a liquid or mixed phase state, or when the temperature and pressure conditions in the reaction zone are such that the alkyl halides are in a liquid state, it is preferable first to separate the complex catalyst. Without any intention of being limited by any specific methods of operation described herein, the removal of the catalyst may be accomplished, for example, by a washing with ice water or the like, which will decompose the complex ethers (together with any excess hydrogen halide absorbed by the reaction mixture), while leaving the unreacted alkylenes and the alkyl halides unattacked. After separation of the aqueous solution, the remaining mixture may first be dried or dehydrated by any known means as by conveyance over anhydrous potassium carbonate, and may then be fractionally distilled to separately recover the unreacted alkylenes, the alkyl halide or halides and the residual products of polymerization and/or condensation which may be formed as by-products during the hydrohalogenation reaction. Only very small percentages of these by-products are produced when the hydrohalogenation is effected in the presence of the ether-metal halide complex catalysts. On the other hand, such operations yield exceptionally good yields of alkyl halides. The catalyst removed from the reaction mixture may obviously be employed for the activation or catalysis of further quantities of alkylenes to be subjected to hydrohalogenation. The unreacted alkylenes separated from the reaction mixture may also be contacted with the complex catalyst and hydrogen halide to yield additional quantities of the corresponding alkyl halide.

The temperatures which may be employed in the execution of the process, may also vary within relatively wide limits. For example, the operating temperature may vary from as low as −80° C., or even lower, to room temperatures or even somewhat higher. However, these temperatures should be below those at which the complex catalyst decomposes. Obviously, the optimum temperature will vary with the operating conditions, such as pressure, reactants employed, etc. The process may be effected with very favorable yields at extremely low temperatures of the order of −80° C. However, such temperatures are in no way essential when the complex catalysts described herein are used, excellent yields being obtainable when the hydrohalogenation addition reaction is effected at higher temperatures. For example, at moderately low temperatures, such as between about −10° C. and 0° C., the addition of hydrogen halides to alkylenes proceeds very smoothly and substantially without the formation of any high boiling by-products of the type of products of polymerization or condensation. Although some products of polymerization may be formed when the reaction is effected at higher temperatures, such as between about 0° C. and 50° C., the percentage of such by-products is considerably lower than that produced when the reaction is effected in accordance with the teachings of the prior art. Furthermore, the operation at such relatively higher temperatures presents the further advantage of greater reaction rates as compared to those required when operating at the lower temperatures.

Although the reaction may be carried out at atmospheric pressures, higher or lower pressures may also be employed. It has been found that it is advantageous to use superatmospheric pressures, ranging as high as 50 atmospheres or even above, since this accelerates the hydrohalogenation reaction so that a substantially quantitative conversion of the alkylenes to the corresponding alkyl halides may be attained within a relatively short reaction period.

As stated, the invention relates to the production of alkyl halides by the interaction of hydrogen halides, such as anhydrous hydrogen chloride, bromide or iodide, with alkylenes or halogenated alkylenes. Although poly-olefins and/or their halogenated analogues may thus be treated, the invention is particularly directed to the hydrohalogenation of mono-olefins and halogenated mono-olefins which may be of secondary or tertiary character. Representative examples of halogenated olefins which may be subjected to this process of hydrohalogenation are allyl chloride, allyl bromide, crotyl chloride, crotyl bromide, methallyl chloride, isocrotyl chloride, n-pentenyl chloride, and the like, and their homologues and analogues. The invention is particularly adapted for the treatment of the relatively higher boiling olefins. As such, reference may be made to the normally liquid secondary and/or tertiary olefins, e. g. amylenes, hexylenes, heptylenes, and their homologues, as well as to the hydrohalogenation of the normally liquid halogenated olefins of the type outlined above. In view of the relative stability, as compared with that of the corresponding tertiary olefins, the process is of particular use for the hydrochlorination of secondary, normally liquid olefins and/or halogenated olefins. However, it may also be applied to the addition of a hydrogen halide to other olefins, such as the normally gaseous olefins, and to gaseous halogenated olefins, such as vinyl halides.

The process may be employed to produce alkyl halides from individual olefins or from mixtures of the same with each other or with their corresponding paraffinic compounds as in the mixtures of hydrocarbons, such as cracked gases or cracked distillates, which are normally produced when petroleum oils are subjected to cracking for the primary purpose of producing high yields of motor fuels. Obviously, the reactions may be most closely controlled when individual compounds are being dealt with, although when using the above-described complex catalysts there is at all times a minimum of undesirable side reactions even when hydrocarbon mixtures containing olefins are subjected to hydrohalogenation according to the present process.

The following examples are presented for the purpose of setting forth several preferred embodiments of the invention, as well as the advantages derived by operating in accordance therewith. These examples, however, are presented only for purposes of illustration and not as a limitative of the invention.

*Example I*

A complex ether-metal halide catalyst was prepared by mixing aluminum chloride with liquid anhydrous diethyl ether in a molar ratio of 2 to 3. Since the addition reaction was exothermic, it was necessary to employ cooling means to remove the relative high reaction heat evolved during the formation of this complex compound.

*Example II*

Five (5) parts by weight of the complex $AlCl_3$-ether catalyst were comingled with 50 parts by weight of pentene-2. The mixture was maintained at a temperature of about −10° C., and anhydrous hydrogen chloride was continuously conveyed through this mixture for a period of about 3¾ hours and at such a rate that this hydrogen chloride gas was completely absorbed in the mixture. In order to aid the reaction, the mixture was constantly maintained in a state of agitation. After all of the hydrogen halide was thus added, the reaction mixture was washed with ice water to remove the catalyst and the unreacted hydrogen halide in solution in the mixture. The aqueous layer thus obtained was then removed, and the non-aqueous layer was dehydrated with anhydrous potassium carbonate. The dehydrated non-aqueous mixture was then fractionally distilled, the unconverted pentene, having a boiling point of 36.4° C., distilling over first. Further fractional distillation caused the recovery of pentyl chloride which distilled over at about 96°–98° C., and the yield of which was about 53% as calculated on the quantity of pentene-2 employed. Only relatively small quantities of products of polymerization were obtained as a residue of this distillation.

*Example III*

Fifty (50) parts by weight of pentene-2 were commingled with five (5) parts by weight of solid aluminum chloride, and the mixture was maintained in a state of agitation and at a temperature of about −10° C. Hydrogen chloride gas was then introduced into this mixture at the same rate and for the same period as employed in Example II. After removal of the catalyst and of the excess hydrogen chloride, and after drying of the remaining mixture, it was fractionally distilled. It was found that the yield of pentyl chloride was only about 32% as calculated on the quantity of pentene employed, while approximately 60% of the pentene used as a starting material was recovered as high-boiling polymerization or condensation products.

A comparison of the results obtained in Examples II and III in which the operations were effected under identical conditions, except for the catalyst employed, shows that the use of the complex metal halide-ether complex not only increased the yield of pentyl chloride by about 70%, but also substantially prevented the polymerization of the unreacted pentene, thus permitting its further hydrochlorination and allowing a substantially quantitative conversion of the olefin into its corresponding alkyl halide.

Example IV

Five (5) parts by weight of an ether AlCl₃ complex catalyst, prepared as described in Example I, were introduced, together with 50 parts by weight of pentene-2, into an acid-proof autoclave made of Hastelloy. Anhydrous hydrogen chloride was then introduced under pressure and at room temperature into this autoclave. Thereafter, the autoclave was closed and rotated to cause an intimate commingling of the reactants and of the complex catalyst. Due to the rapid addition of the hydrogen chloride to the pentene, a rise in temperature to about 46° C. was noted. Also, the pressure increased to a maximum of about 48 atmospheres. The total time necessary for effecting the addition reaction was 15 minutes, after which the mixture was withdrawn from the autoclave and treated as described in Example II, i. e., the mixture was washed to remove the catalyst and excess HCl, dried and fractionally distilled. The pentyl chloride was obtained in a practically theoretical yield, while only a few per cent. of the pentene was found to have polymerized.

On the other hand, when operating under substantially identical conditions but for the use of a solid aluminum chloride catalyst in lieu of the ether-AlCl₃ complex, the reaction products contained only a very small amount of pentyl chloride, while most of the pentene was found to have been converted into products of polymerization or condensation.

The reaction tube or reaction chamber may be of any suitable material. Good results, however, are obtained when such vessel is made of or lined with materials which are resistant to the action of the hydrogen halides. As such, reference may be made to materials of the type of Hastelloy, KA₂ steel, nickel, quartz, carbon and Monel metal. Obviously, when the reaction is to be effected under superatmospheric pressures, the vessel must be designed to withstand such pressures.

The reaction may be effected batch-wise or in a continuous manner. Although a large number of complex catalysts have been described herein, it is to be understood that there is no intention to make them equivalents as far as degree of activation is concerned, since some of these catalysts possess greater activity than others. For example, complex compounds formed by the interaction of aliphatic ethers with metallic halides, such as aluminum chloride, boron trifluoride, and the like, have been found to be exceptionally good catalysts for the hydrohalogenation of olefins according to the present process.

We claim as our invention:

1. In a process for hydrochlorinating mono-olefins, the steps of mixing a normally liquid mono-olefin with a diethyl ether solution of a complex compound formed by the interaction of aluminum chloride with diethyl ether, maintaining said liquid mixture at a superatmospheric pressure and at a temperature of between about $-10°$ C. and about $+50°$ C., conveying gaseous hydrogen chloride through the mixture thereby effecting hydrochlorination of the mono-olefin, and recovering the alkyl chloride thus produced.

2. In a process for hydrohalogenating mono-olefins, the steps of commingling a normally liquid mono-olefin with a diethyl ether solution of a complex compound formed by the interaction of aluminum chloride with diethyl ether, maintaining said liquid mixture at a temperature of between about $-10°$ C. and about $+50°$ C., conveying a gaseous hydrogen halide through said mixture thereby effecting hydrohalogenation of the mono-olefin, and recovering the alkyl halide thus produced.

3. The process according to claim 1, wherein the hydrogen halide is conveyed through the liquid mixture at such a rate that substantially all of the hydrogen halide is absorbed.

4. The process according to claim 1, wherein the reaction is effected at a superatmospheric pressure.

5. In a process for obtaining alkyl halides, the steps of interacting mono-olefins having at least five carbon atoms per molecule with a hydrogen halide in the presence of a liquid complex compound formed by the interaction of aluminum chloride with an ether, and effecting the reaction at a temperature of between about $-10°$ C. and about $+50°$ C. thereby producing a high yield of alkyl halides while inhibiting the polymerization of the mono-olefins.

6. The process according to claim 5, wherein the reaction is realized by conveying the hydrogen halide through a liquid mixture comprising the mono-olefins and the complex aluminum chloride-ether compound.

7. In a process of producing alkyl halides, the steps of contacting olefins with a hydrogen halide in the presence of an ether solution of a complex compound formed by the interaction of an aluminum halide with ether, and effecting the hydrohalogenation reaction at a temperature of between about $-10$ C. and about $+50°$ C., thereby producing high yields of alkyl halides while inhibiting the polymerization of the olefins.

8. The process according to claim 7, wherein the hydrohalogenation reaction is realized at a superatmospheric pressure.

HEIN ISRAEL WATERMAN.
JACOB JAN LEENDERTSE.